United States Patent
Hara (10) Patent No.: US 8,743,386 B2
(45) Date of Patent: Jun. 3, 2014

(54) EXECUTING A PRINT JOB IN ACCORDANCE WITH INPUT IMAGE DATA

(75) Inventor: Kenji Hara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/509,182

(22) PCT Filed: Apr. 4, 2012

(86) PCT No.: PCT/JP2012/059830
§ 371 (c)(1),
(2), (4) Date: May 10, 2012

(87) PCT Pub. No.: WO2012/137973
PCT Pub. Date: Oct. 11, 2012

(65) Prior Publication Data
US 2012/0257244 A1  Oct. 11, 2012

(30) Foreign Application Priority Data
Apr. 5, 2011  (JP) .................................. 2011-084078

(51) Int. Cl.
*G06K 15/02* (2006.01)
(52) U.S. Cl.
USPC ........................ 358/1.14; 358/437; 358/442
(58) Field of Classification Search
USPC ......... 358/1.1, 1.14, 400, 401, 434, 437, 442, 358/296
See application file for complete search history.

(56) References Cited

U.S. PATENT DOCUMENTS

| 4,991,114 A * | 2/1991 | Kawamura et al. .......... 358/1.15 |
| 7,430,713 B2 | 9/2008 | Kobashi et al. |
| 7,712,026 B2 | 5/2010 | Kobashi et al. |
| 7,757,167 B2 | 7/2010 | Kobashi et al. |
| 7,920,288 B2 | 4/2011 | Hara |
| 2007/0287494 A1 | 12/2007 | You et al. |
| 2008/0120437 A1 * | 5/2008 | Butterfield ....................... 710/5 |

FOREIGN PATENT DOCUMENTS

| JP | 2007-267388 A | 10/2007 |
| JP | 2009-211704 A | 9/2009 |

OTHER PUBLICATIONS

International Search Report dated May 8, 2012 issued in corresponding PCT Application No. PCT/JP12/059830.

* cited by examiner

*Primary Examiner* — Thomas D Lee
(74) *Attorney, Agent, or Firm* — Fitzpatrick, Cella, Harper & Scinto (57) ABSTRACT

In a printing apparatus, control is performed such that, among buttons displayed by a display means, if while a first button for inputting a setting with respect to a job to be executed by the printing apparatus is in the touched state, a touch operation is furthermore performed on a second button for inputting another setting with respect to the job, the setting indicated by the second button is not performed, and if while the first button for inputting the setting with respect to the job to be executed by the printing apparatus is in the touched state, a touch operation is furthermore performed on a third button for interrupting a print job being executed by the printing apparatus, the print job that is being executed is interrupted based on the touch operation performed on the third button.

9 Claims, 9 Drawing Sheets

EXECUTING A PRINT JOB IN ACCORDANCE WITH INPUT IMAGE DATA

TECHNICAL FIELD

The present invention relates to a printing apparatus, a method for controlling the same, and a storage medium.

BACKGROUND ART

With conventional image forming apparatuses (printing apparatuses), buttons having a mechanical mechanism (hereinafter, referred to as "hardware buttons") are generally used as input operation units. However, in recent years there are known to be apparatuses that have a more graphic liquid crystal display unit and a touch panel (including a tablet apparatus) via which operations and input can be performed using a finger, touch pen, or the like on buttons formed by graphic images created on the liquid crystal display (hereinafter, referred to as "software buttons").

Japanese Patent Laid-Open No. 2009-211704 proposes an apparatus configured including an operation unit made up of only a touch panel that has almost no hardware buttons. Also, although touch panels have normally been single-touch panels that can accept user input at only one point at a time, in recent years there have also been multi-touch panels that can accept input at multiple points at the same time. When a multi-touch panel is used, it is possible to apply multiple simultaneous input for inputting an intuitive operation such as screen zooming. When buttons on a touch panel are operated, it is desirable to perform control such that unnecessary input is discarded and only one input is accepted at a time in order to improve the user interface, as disclosed in Japanese Patent Laid-Open No. 2009-211704 as well.

However, conventional technology has problems such as the following. Although there has been an increase in the number of apparatuses that realize user input using a touch panel as mentioned above, hardware buttons that are independent of a touch panel have superiority in that they can always be pressed by the user in any situation. Specifically, it is desirable for buttons that are frequently pressed and buttons that have a critical function, such as a switch for urgent stopping, are provided as independent hardware buttons instead of being provided on the touch panel. For example, physical buttons are characteristic in that they can always be pressed, even if the user is performing an ongoing input operation on the touch panel, and even if the touch panel becomes stuck in the pressed state due to some sort of failure, and thus physical buttons can contribute to an improvement in usability.

However, if such hardware buttons can be eliminated, the apparatus can be given a more sleek visual appearance, and cost can be reduced. These hardware buttons can be eliminated by merely displaying physical buttons on the touch panel at a position that can always be pressed. However, since normal touch panels are created such that button input is performed using only one finger, it has not conventionally been possible to provide a physical button's characteristic ability to always be pressed.

SUMMARY OF INVENTION

The present invention enables realization of a printing apparatus that enables a hardware button that can be pressed with priority over a software button to be realized using a software button without impairing the superiority of hardware buttons, as well as a method for controlling the printing apparatus and a storage medium.

One aspect of the present invention provides a printing apparatus that executes a print job in accordance with image data that was input, comprising: display means for including a touch panel and displaying a plurality of buttons for inputting instructions to the printing apparatus in accordance with a touch operation performed by a user; and control means for performing control such that, among the plurality of buttons displayed by the display means, if while a first button for inputting a setting with respect to a job to be executed by the printing apparatus is in a touched state, a touch operation is furthermore performed on a second button for inputting another setting with respect to the job, the setting indicated by the second button is not performed, and if while the first button for inputting the setting with respect to the job to be executed by the printing apparatus is in the touched state, a touch operation is furthermore performed on a third button for interrupting a print job being executed by the printing apparatus, the print job that is being executed is interrupted based on the touch operation performed on the third button.

Another aspect of the present invention provides a method for controlling a printing apparatus that executes a print job in accordance with image data that was input, comprising: displaying, by display means that includes a touch panel, a plurality of buttons for inputting instructions to the printing apparatus in accordance with a touch operation performed by a user; and performing control such that, among the plurality of buttons displayed by the display means, if while a first button for inputting a setting with respect to a job to be executed by the printing apparatus is in a touched state, a touch operation is furthermore performed on a second button for inputting another setting with respect to the job, the setting indicated by the second button is not performed, and if while the first button for inputting the setting with respect to the job to be executed by the printing apparatus is in the touched state, a touch operation is furthermore performed on a third button for interrupting a print job being executed by the printing apparatus, the print job that is being executed is interrupted based on the touch operation performed on the third button.

Further features of the present invention will be apparent from the following description of exemplary embodiments with reference to the attached drawings.

DESCRIPTION OF EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

Configuration of Image Forming Apparatus

Figure 1:
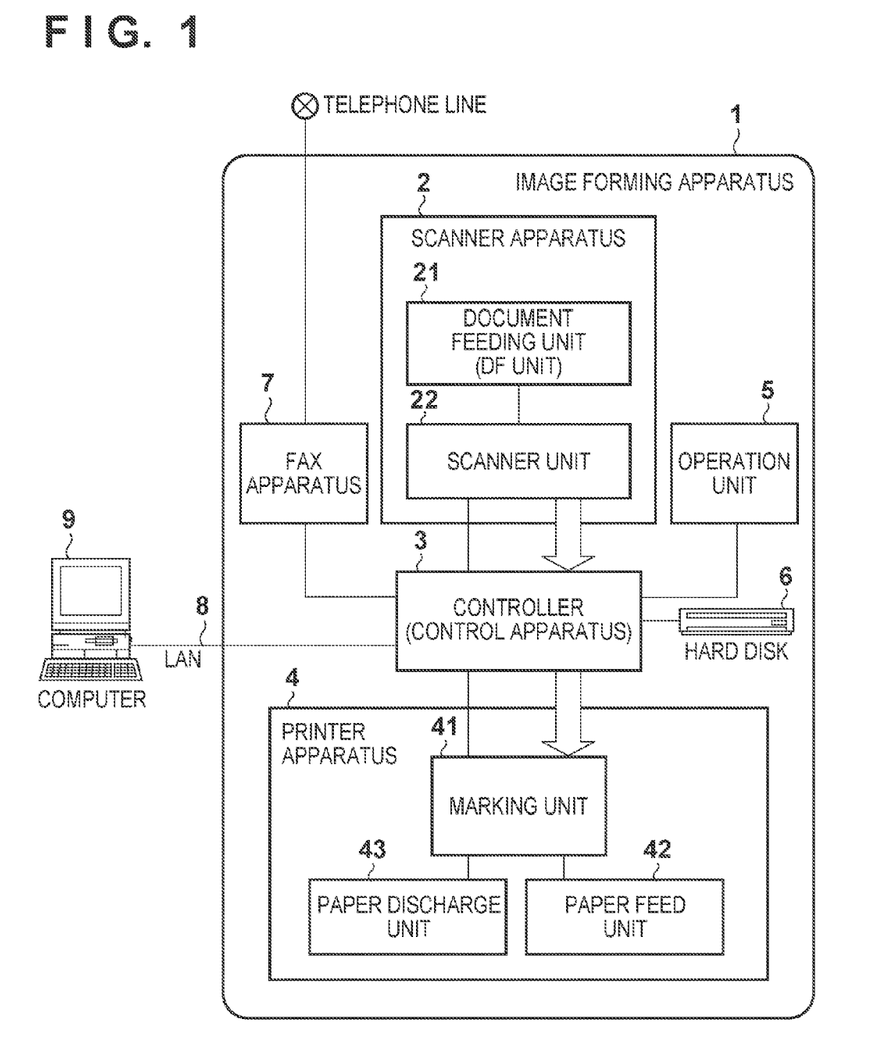
FIG. 1 is a block diagram showing an example of the configuration of an image forming apparatus.

First, an example of the configuration of an image forming apparatus (printing apparatus) 1 according to the present embodiment will be described with reference to FIG. 1. The image forming apparatus 1 includes a scanner apparatus 2, a controller 3, a printer apparatus 4, an operation unit 5, a hard disk 6, and a FAX apparatus 7. The scanner apparatus 2 optically reads an image from an original and converts it into a digital image. The printer apparatus 4 outputs the digital image on a recording material. The operation unit 5 is a user interface for performing operations on the image forming apparatus 1. The hard disk 6 stores digital images, a control program, and the like. Also, the FAX apparatus 7 transmits digital images via a telephone line or the like. The controller 3 is connected to various components and executes jobs in the image forming apparatus 1 by giving instructions to various modules.

The image forming apparatus 1 can perform the input and output of digital images with a computer 9 via a LAN 8, issue jobs, give instructions to devices, and so on. The scanner apparatus 2 includes a document feeding unit 21 that can automatically successively feed sheets from an original bundle, and a scanner unit 22 that can optically scan an original and convert it into a digital image, and the scanner apparatus 2 transmits converted image data to the controller 3. The printer apparatus 4 includes a paper feed unit 42 that can successively feed sheets one at a time from a paper bundle, a marking unit 41 for printing image data onto feed sheets, and a paper discharge unit 43 for discharging sheets after printing.

The image forming apparatus 1 can execute a wide variety of jobs. The following are some examples.

(1) Duplication Function

An image read by the scanner apparatus 2 is recorded on the hard disk 6 and printed at the same time using the printer apparatus 4.

(2) Image Transmission Function

An image read by the scanner apparatus 2 is transmitted to the computer 9 via the LAN 8.

(3) Image Storage Function

An image read by the scanner apparatus 2 is recorded on the hard disk 6, and then image transmission and/or image printing is performed as necessary.

(4) Image Printing Function

Page description language, for example, that has been transmitted from the computer 9 is analyzed and printed by the printer apparatus 4.

Configuration of Controller

Figure 2:
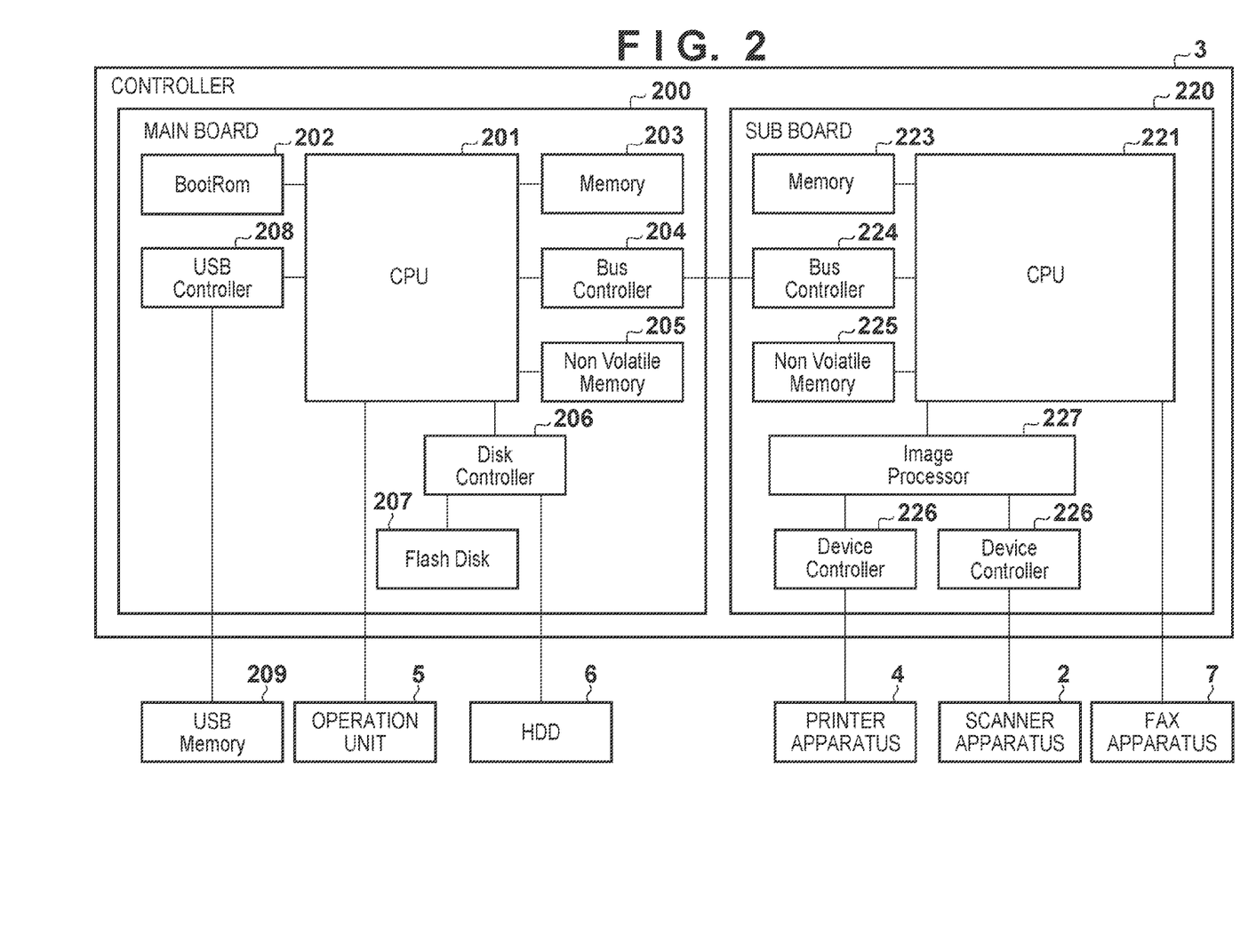
FIG. 2 is a block diagram showing an example of the configuration of a controller.

Next, an example of the configuration of the controller will be described with reference to FIG. 2. The controller 3 includes a main board 200 and a sub board 220. The main board 200 is a so-called general-purpose CPU system. The main board 200 includes a CPU 201 that performs overall control of the board, a BootRom 202 that includes a boot program, a memory 203 used as a work memory by the CPU, a bus controller 204 that functions as a bridge with an external bus, and a non volatile memory 205 that is not erased even when the power supply is interrupted. The main board 200 further includes a disk controller 206 that controls a storage apparatus, a flash disk (SSD or the like) 207, which is a relatively low-volume storage apparatus configured by a semiconductor device, a USB controller 208 that can control a USB, and the like. The main board 200 is connected to external devices such as a USB memory 209, the operation unit 5, and the hard disk 6.

The sub board 220 is configured from a relatively small general-purpose CPU system and image processing hardware. Specifically, the sub board 220 includes a CPU 221 that performs overall control of the board, a memory 223 used as a work memory by the CPU, a bus controller 224 that functions as a bridge with an external bus, and a non volatile memory 225 that is not erased even when the power supply is interrupted. The sub board 220 further includes an image processing processor 227 that performs real-time digital image processing and device controllers 226. The scanner apparatus 2 and the printer apparatus 4, which are external devices, exchange digital image data via the device controllers 226. The FAX apparatus 7 is directly controlled by the CPU 221. Note that FIG. 2 is a block diagram that has been simplified. For example, although the CPU 201, the CPU 221, and the like include many other CPU peripheral hardware elements such as a chipset, a bus bridge, and a clock generator, descriptions thereof will not be given since their configurations are not necessary for describing the present invention.

The following describes the operation of the controller 3, taking the example of the duplication of an image onto a recording material (copy job). When a user instructs image duplication from the operation unit 5, the CPU 201 sends an image reading instruction to the scanner apparatus 2 via the CPU 221. The scanner apparatus 2 optically scans a paper original, converts it into image data, and inputs the image data to the image processing processor 227 via the device controller 226. The image processing processor 227 temporarily stores the digital image data by performing DMA transfer of the digital image data to the memory 223 via the CPU 221.

When it has been detected that a certain amount or all of the digital image data has been stored in the memory 223, the CPU 201 gives an image output instruction to the printer apparatus 4 via the CPU 221. The CPU 221 informs the image processing processor 227 of the position of the image data in the memory 223. The image data in the memory 223 is transmitted to the printer apparatus 4 via the image processing processor and the device controller 226 in accordance with a synchronization signal from the printer apparatus 4, and an image is printed onto a recording material by the printer apparatus 4 based on the digital image data. In the case of printing multiple sets of an image onto recording sheets, the CPU 201 stores the image data in the memory 223 to the hard disk 6 such that when the image is to be printed for the second time and thereafter, the image can be sent from the hard disk 6 to the printer apparatus 4 without being received from the scanner apparatus 2.

Configuration of Operation Unit

Next, an example of the configuration of the operation unit 5, which is a user interface, will be described with reference to FIG. 3. Note that this is a description of a general operation unit, and details regarding the operation unit according to the present embodiment will be described later with reference to FIG. 5. Reference numeral 301 denotes the exterior of the operation unit 5. Reference numeral 302 denotes a tally light that includes an LED and is for notifying the user of an error by, for example, flashing when an error has occurred. Reference numeral 303 denotes an LCD touch panel area in which a touch panel has been laid over an LCD apparatus (display unit) that can display bitmaps. Reference numeral 304 denotes a hard key area. Reference numeral 305 denotes number buttons. The number buttons 305 are used when inputting a number such as the number of times a job is to be executed, a telephone number, or the like. Reference numeral 306 denotes an enter/exit power saving button. The apparatus can be caused to enter or exit the power saving state by pressing this button. Reference numeral 307 denotes a job start button. A job can be started by pressing this button. Reference numeral 308 denotes a stop button, and a job that is being executed can be ended by pressing this button.

Next is a description of the internal configuration of the operation unit 5. The area denoted by 309 is a block included in the operation unit exterior 301. First, a description of the input system of the operation unit 5 will be given. Reference numeral 310 denotes a hard key area, which corresponds to the hard key area 304. Reference numerals 311, 312, 313, and 314 are buttons respectively corresponding to the buttons 306, 308, 305, and 307. Reference numeral 315 denotes a key matrix. Normally, in this sort of case where a certain number of buttons are provided, cost is suppressed by providing a key matrix instead of allocating detection resources to all of the buttons. The key matrix is encoded by a key encoder 316, and a CPU 319 can detect which key was pressed or released.

Reference numeral 317 denotes a touch panel that includes an LCD (liquid crystal display). Input from the touch panel is encoded by a touch panel encoder 318, and the CPU 319 can detect which coordinates on the touch panel were pressed or released, or continue to be pressed. The CPU 319 is a small CPU that controls the operation unit 5, and creates communication packets based on input from the above-described keys and touch panel. The CPU 319 also outputs input information from the operation unit 5 to the outside of the device via an interface 320. Reference numeral 321 denotes an interface that is compatible with the interface 320.

The above-described system enables the CPU 201 to be informed of input information from the hard keys or the touch panel of the operation unit 5. The CPU 201 is the master CPU that performs overall control, and generates and deletes jobs in accordance with key input.

Next is a description of the output system of the operation unit 5. In the case where the CPU 201 outputs a screen to the LCD, the CPU 201 functions as a display control means and performs rendering to a VRAM (not shown). The VRAM is a video RAM, and data written to the VRAM is periodically read by the interface 321, the interface 320, and an LCDC (LCD controller) 322 and displayed on the LCD screen in accordance with the refresh rate of the LCD. Since the amount of screen data is very large, it is normal in video system standard technology to have a configuration in which after the CPU has performed initialization, LCD output can be performed by merely writing bitmaps to a VRAM area that has been virtually created in a DRAM. In this way, the CPU 201 can display desired images on the touch panel 317. If the CPU 201 detects information such as an apparatus abnormality, the CPU 319 is notified of such information via the interface 321 and the interface 320. In order to inform the user of an abnormality, the CPU 319 can flash the tally light 324 or operate a buzzer 325 via a driver 323. The operation unit 5 described in detail above is located outside the controller shown in FIG. 2, and is a critical unit for user operations and user notifications.

Reference numeral 326 denotes a button rendered on the LCD. When many buttons are rendered on the LCD, each is given a bitmap shadow, for example, and given the appearance of bulging outward, thus giving that area the appearance of an independent button. The CPU 201 stores the coordinate location where the button is rendered, and performs control such that the button is pressed when input from within that area is input from the touch panel. For example, the user can visually confirm that the button has been pressed by rendering the button so as to bulge inward when touched, and also visually become aware that the button was released by rendering the button so as to bulge outward when released. Note that although a touch panel is used in the present embodiment, the present invention can also be applied to the case of including a dedicated input apparatus such as a pen, as in the case of a tablet.

Button Control

Next, control with respect to buttons on the touch panel will be described with reference to FIG. 4. Normally, a software button on the touch panel is constructed two-dimensionally as with the button 326 shown in FIG. 3, and it is necessary to make determinations regarding both the X direction and the Y direction when detecting a pressed position. However, since these determinations are made in a similar manner, FIG. 4 only shows the case of one dimension in order to simplify the description. Specifically, a cross section 328 in FIG. 3, which is taken by cutting the LCD panel along a line 327, corresponds to a line 435 in FIG. 4, and an X-direction width 329 of the button 326 rendered on the LCD corresponds to a normal button 436 in FIG. 4. The arrows in FIG. 4 represent the finger of the operator touching (downward arrow) or moving away from (upward arrow) the LCD screen. Note that FIG. 4 shows pressing pattern cases 400, 403, 406, 410, 415, 420, and 425.

Basically two general determination methods are employed as the button determination method.

(A) Detect when a press was made inside a button area.

(B) Detect when a press was made inside a button area, and furthermore when the press inside the button area was released.

The case 400 is the most standard touch case. A press is made inside the area of the normal button 436 as shown by an arrow 401, and then the press inside the area of the normal button 436 is released as shown by an arrow 402. With the case 400, a button press determination can be made using both of the above determination methods A and B.

The case 403 is an operation in which the normal button area is pressed as shown by an arrow 404, the finger is moved outside the normal button area while still pressing downward, and then the press is released at the position shown by an arrow 405. In this case, a press determination can be made using the determination method A, but cannot be made using the determination method B.

The difference here gives the user the following two feelings. Specifically, in the case of A, input is performed immediately when the touch panel is touched, and therefore touch input can feel speedy. This enables improving the operational feeling in the case of displaying a calculator with large buttons or the like on the LCD, for example. However, with the determination method A, input is made even if the touch panel is mistakenly touched. Specifically, the panel itself of the touch panel does not have recessions or projections, and since button pressing operations are performed, input is made even if the touch panel is touched unintentionally. In the case where there is a desire to achieve pressing accuracy in order to resolve this problem, a method of determining that a button was pressed when the finger is released is used, such as the determination method B for detecting that a press was made and released inside a button area. If a press is mistakenly made in this case, button input can be canceled by moving the finger outside the button area and then releasing it. This corresponds to the operation in the case 403.

The case 406 is the case where a position outside the button is pressed and then the finger is moved inside the button while still pressing downward as shown by an arrow 407, and then the press is released inside the button as shown by an arrow 408. Button input can be enabled in this case by using a method of determining that button input is made when the finger is released, but normally such input is not permitted since it feels strange to the user. This completes the description of basic patterns of button input on the LCD. Although there are other input methods as well, such algorithms will not be described since they are not essential to the description of the present invention.

Next, a description will be given of the case of touching the LCD with multiple fingers. LCD touch panels are divided into single-touch panels and multi-touch panels. They can be configured differently through the configurations of the touch panel 317, the touch panel encoder 318, and the CPU 319. Recent years have also seen the appearance of apparatuses that enable multi-touch input.

As previously mentioned, a normal touch panel is operated using one finger. This is because input errors tend to occur when operations are made using multiple fingers (many points are pressed), and it is common to perform control so as to disable input when input is made at multiple places. For example, in conventional technology, a configuration has been proposed in which, in an apparatus having a multi-touch touch panel, single-touch and multi-touch are permitted or prohibited according to the class configuring the screen view (area). This is because in the case of button pressing, a single-touch configuration can better prevent input errors and improve the operationality of the user interface. This is because it is thought that multi-touch operations are preferable for use in an input method for making "gestures" on the touch panel such as increasing/decreasing the size of the screen, and not for specifying an area on the screen.

The following describes control that is preferable in the case where input is made at multiple points at the same time, with reference to FIG. 4. The case 410 is the case where a first press is made inside the button area as shown by an arrow 411, and then before that finger is released, a second press is made outside the button area by a different finger as shown by an arrow 412. Thereafter, the first press is canceled as shown by an arrow 413, and the second press is canceled as shown by an arrow 414. In this case, normally control is often performed for canceling (discarding) the first press 411 due to the fact that the improper second press 412 was performed. Specifically, the fact that a press was made inside the button area, that is to say, the finger releasing event 413, is canceled, and therefore it is treated as if the normal button was not pressed. This control improves the accuracy of button pressing and leads to an improvement in operationality for the user.

Similarly, the case 415 is the case of an operation in which a first button is pressed as shown by an arrow 416, a second button is pressed as shown by an arrow 417, and then the first button is released as shown by an arrow 418, and the second button is released as shown by an arrow 419. In the case 415, it is desirable that button pressing is disabled since different improper touch panel input is detected for both the first button and the second button between when they are pressed and when they are released. In this way, in the case where touch input is made multiple times with respect to buttons displayed on the LCD screen, operationality may be improved by canceling such input.

Configuration of Operation Unit Including Only a Touch Panel

Figure 5:
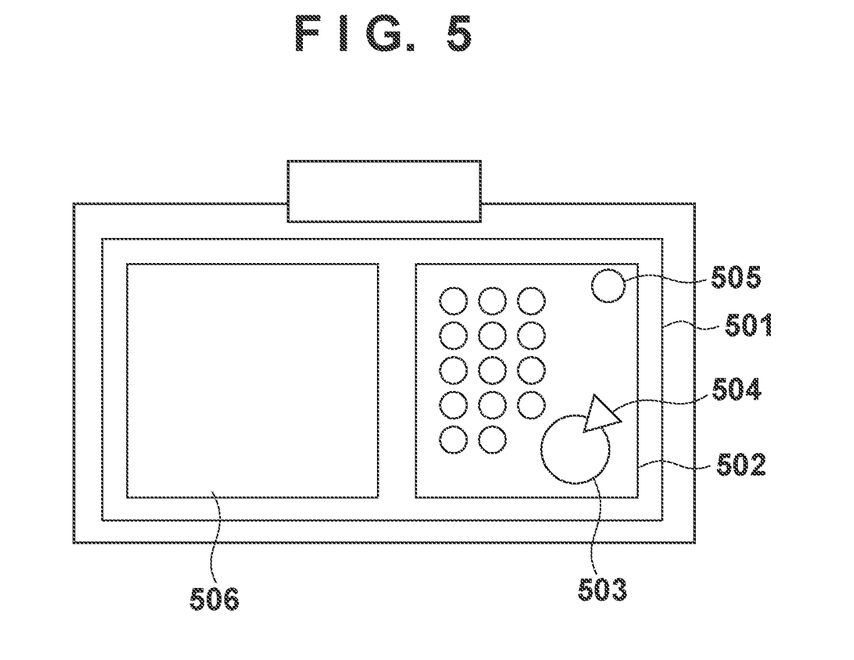
FIG. 5 is a diagram showing an operation unit made up of only a touch panel according to an embodiment of the present invention.

The following describes an example of the configuration of an operation unit including only a touch panel, which is advantageous for more effective application of the present invention, with reference to FIG. 5. Whereas FIG. 3 shows an operation unit including physical buttons that have a mechanical mechanism, FIG. 5 shows an operation unit in which the entirety of an area indicated by 501 is made up of an LCD touch panel. Reference numeral 502 denotes a button area that is a bitmap corresponding to 304 rendered on the LCD touch panel 501, and this button area 501 does not have a physical mechanism and can be operated in a conventionally compatible manner using the touch panel. Buttons 503, 504, and 505 are software buttons that respectively correspond to the buttons 307, 308, and 306. Reference numeral 506 denotes an existing rendering area, and the display in this area is the same as that in the area 303.

Eliminating physical buttons in this way enables eliminating the hard keys in the hard key area 310 and the key encoder 316, thereby enabling realizing a reduction in cost. Also, in the case where, for example, the display of the button area 502 is omitted, and an image is displayed at a large size using the entirety of the area 501, the area 501 can be employed in various applications using large images. Furthermore, a visual improvement can also be expected since a simple and sleek form is achieved.

However, there are also problems with the configuration of the operation unit shown in FIG. 5. People perceive such apparatus input in a sensory manner, and since a touch panel that lacks the sensation of pressing down cannot provide the feeling of a click, there are cases where operations feel unpleasant. Many inventions have been proposed for avoiding this. There is also the problem that a button can no longer always be pressed, unlike a physical button, and the present invention proposes a technique for resolving this problem.

Figure 3:
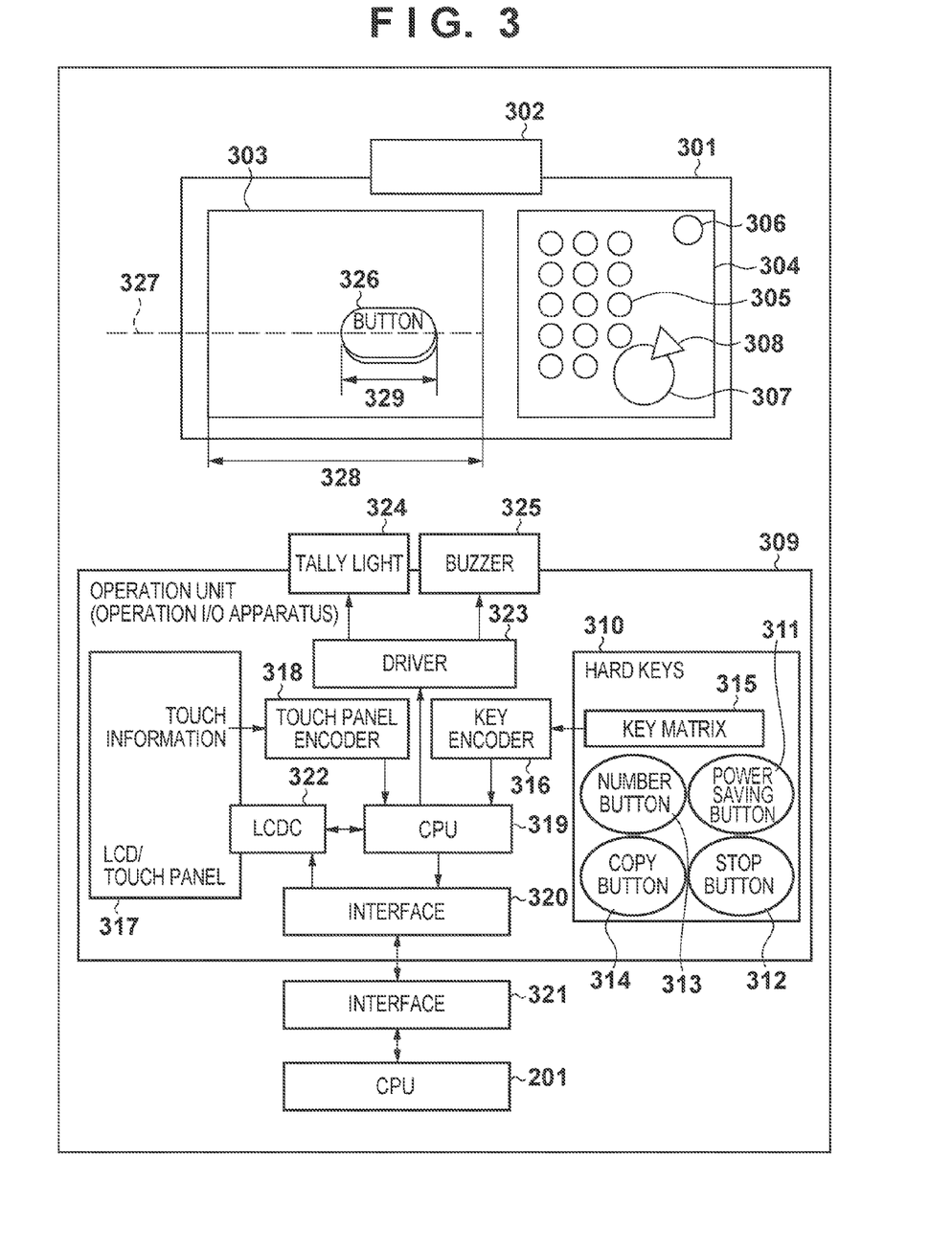
FIG. 3 is a diagram showing an example of the configuration of an operation unit.
Figure 4:
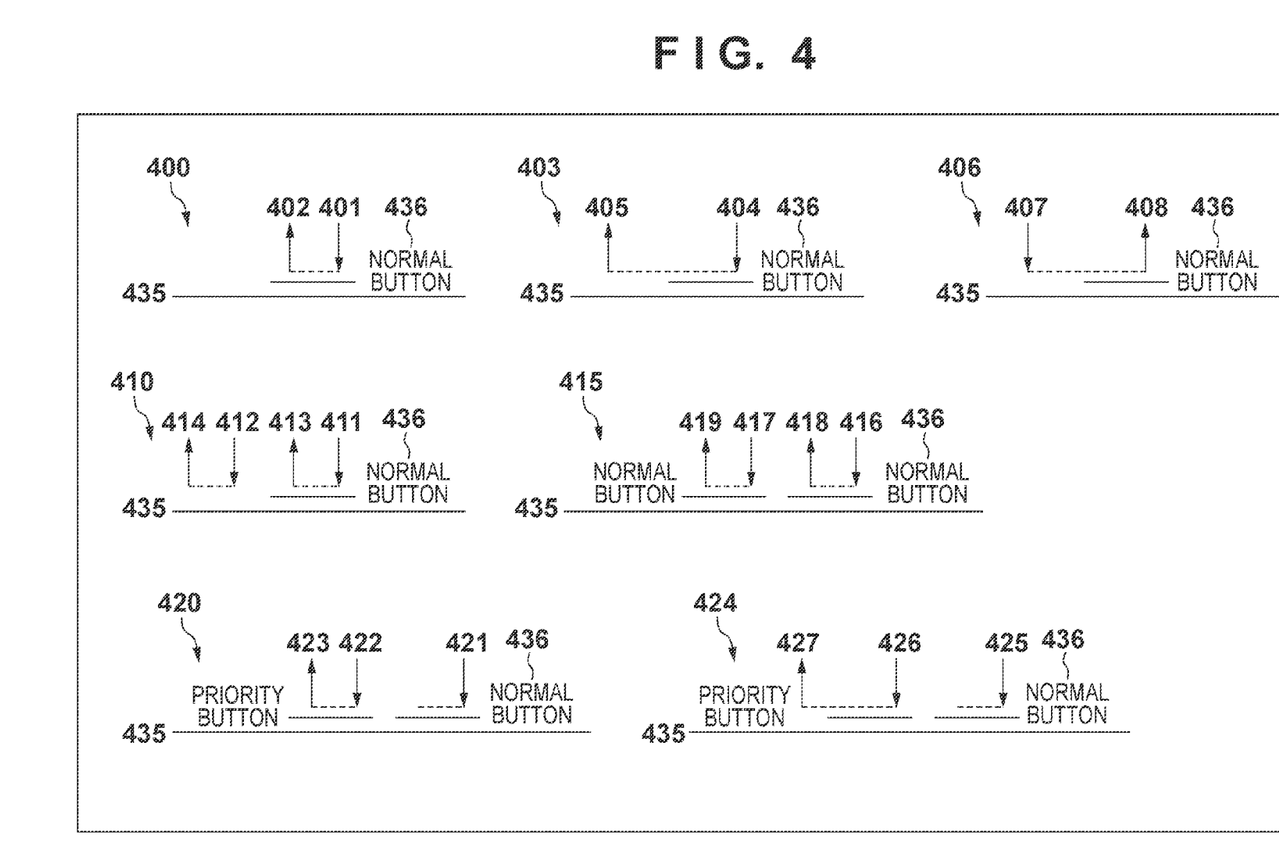
FIG. 4 is a diagram showing control with respect to buttons on a touch panel.

With the operation unit shown in FIG. 3, the touch panel (software buttons) and the physical buttons (hardware buttons) have independent configurations, and the physical buttons 311 to 314 included in the hard key area 310 can always be pressed, even if the touch panel is being pressed. In other words, the physical buttons have superiority in that they can always be pressed, regardless of the state of the touch panel. This superiority is lost in the case of an interface in which all input is performed using the touch panel. One specific problem is the pattern previously described in the case 415, that is to say, control is performed for disabling presses if the second press is made while the first press is being made.

A problem resulting from this characteristic arises with the stop button 312. The stop button 312 can always be pressed, and can always issue a job stop event. However, if this stop button is realized as a software button on the touch panel, the situation in which the stop button cannot be pressed occurs simply if one finger is placed at any other location on the touch panel. Although there is a low possibility that the operator will perform such an operation with two fingers, the stop button ceases to be able to be pressed also in cases such as the case where the frame member of the touch panel is being pressed, or the case where an unnoticed piece of debris such as a pin is touching the touch panel.

There are also sensory problems. The world of computers simulates the physical world more and more each year. One example is that touch panels simulate physical buttons, and even in the case of such an event that would seemingly not normally occur, the user will have a sense of unpleasantness if the essence of the original configuration is lost. A similar example is the previously described lack of the feeling of a click. Achieving improvements in these situations enables improving the man-machine interface.

Operation Flow

Figure 6:
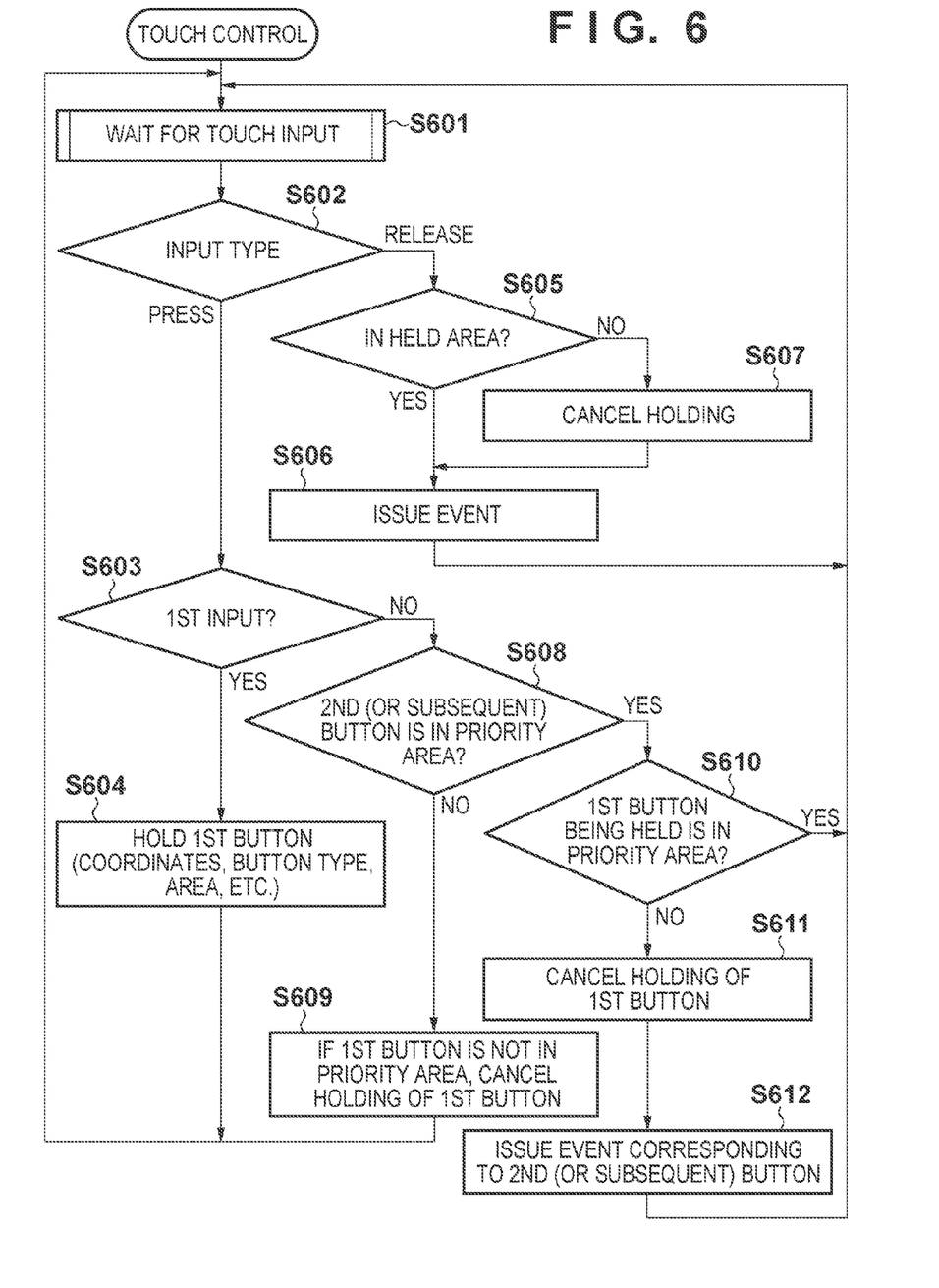
FIG. 6 is a flowchart showing a flow of operations according to the embodiment.

The following describes a specific operation flow of the present invention for resolving the aforementioned sensory problems with reference to FIG. 6. Note that the CPU 201 of the controller 3 performs overall control of the processing described below. Touch panels are classified into single-touch panels and multi-touch panels, and the following flow in FIG. 6 can applied to, for example, (1) the case where a multi-touch input apparatus is provided, but single-touch emulation is performed for usability, and only one input can be performed at a time (417 in the case 415). Another example is (2) the case where a single-touch input apparatus is provided, but when a second press is made while a first press is being made, the CPU 319 processes the second press without discarding it, and sends coordinate information to the CPU 201 (417 in the case 415).

In this flowchart, touch panel coordinates sent via the interfaces 320 and 321 are processed. First, in step S601 the CPU 201 executes touch input standby processing. When touch input is detected in touch input standby processing, the procedure proceeds to step S602. In step S602, the CPU 201 makes a determination regarding the input type. Here, the input types include input when the operator presses the touch panel, and input when the operator releases a press made on the touch panel. Therefore, in accordance with the operator input, the CPU 201 receives, from the CPU 319, press information indicating that the operator pressed the touch panel or cancel information indicating that the operator released the press from the touch panel, along with a display unit coordinate position in the touch panel. If the input type is "press", the procedure proceeds to step S603, in which the CPU 201 determines whether the press was first input (a first press). Here, "first input" refers to initial input when no other input is currently being made. In the case of first input, the procedure proceeds to step S604, in which the CPU 201 holds the button type of the first button and the pressed coordinates, and thereafter the procedure returns to step S601, and an input change is waited for.

Next, if the input type is "release" in step S602, the procedure proceeds to step S605, in which the CPU 201 determines whether the press was released inside the area according to the button type of the first button. Specifically, the CPU 201 determines whether the release was made inside or in the vicinity of the area of the button corresponding to the pressed coordinates held in step S604. In a different case, it is determined that the press was released after moving outside the button (case 403), that is to say, the input was canceled, and the procedure proceeds to step S607, in which the CPU 201 deletes the first information that was held in step S604, and the procedure proceeds to step S606. On the other hand, if it is determined in step S605 that the press was released in the same area, the procedure proceeds to step S606. In step S606, the CPU 201 issues an event corresponding to the released button type, and the procedure returns to step S601. When an event is generated, processing corresponding to the event is executed (case 400).

If touch input is made while the first input is being made, that is to say, while waiting for input in step S601 after step S604, and the key input type is determined to be "press" in step S602, the CPU 201 determines in S603 that the input is not the first input, and the procedure proceeds to step S608. In step S608, the CPU 201 functions as a priority area determination means and determines whether the button on which the second input (second press) was made is a priority area. Here, a priority area is an area for displaying a software button that can be pressed with priority over other software buttons, such as the stop button for stopping a job that is being executed, and the stop button for stopping the apparatus. If the second input was not made in a priority area, the procedure proceeds to step S609, in which the CPU 201 determines whether the first button touch was made in a priority area, and in the case where it was not made in a priority area, the holding of the first button is canceled (case 415).

On the other hand, if it is determined in step S608 that the second button is a priority area, the procedure proceeds to step S610, in which the CPU 201 determines whether the first button input was made in a priority area. If it was made in a priority area, the second button input is canceled, and the procedure returns to step S601. On the other hand, if the first button is not a priority area, and the second button is a priority area, the procedure proceeds to step S611, in which the CPU 201 cancels the holding of the first button, and then issues an event corresponding to the second button in step S612 (422 in case 420). In the case where an event is to be issued at the timing of the release 423 in the case 420, it is sufficient that in step S612 the button type and coordinates of the second button are stored similarly to step S604. The next time the press is released, the second touch event is processed with priority in steps S602 to S604 and S606.

Using this flow enables input with respect to a button with priority to be made with a high priority in a special determination. Accordingly, using this flow enables detecting the press of a priority button at the press 422 in the case 420, and enables determining that the priority button was pressed at the release 423 in the same button instead of at the press 422. It is also possible to cancel the priority button at the release 427 in the case 424.

Note that more information is sent from the touch panel in actuality. One example of such information is information indicating that the coordinates have been updated due to moving of the finger. Describing all of the patterns would result in a very long description, and therefore the above description focuses on the control flow in the case where second input is made while first input is being made, which is one point of the present invention.

Job Control

Figure 7:
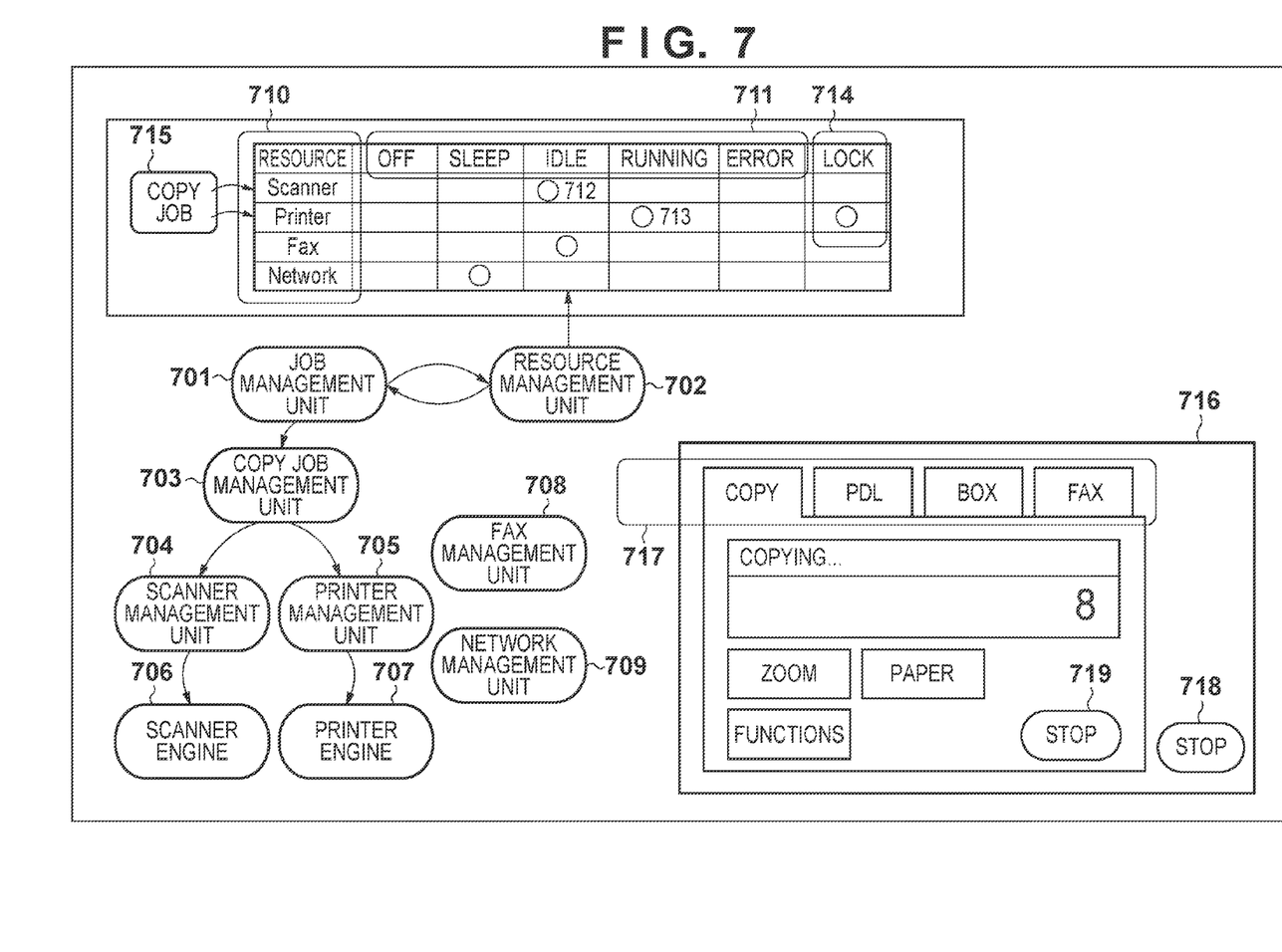
FIG. 7 is a diagram for describing the details of job control.

Next, details of job control will be described with reference to FIG. 7. Blocks 701 to 709 shown in FIG. 7 are functional blocks realized by the controller 3. Reference numeral 701 denotes a job management unit. For example, if the copy button 314 is pressed, the job management unit 701 is notified of a copy job start event. The job management unit 701 ensures a resource for a resource management unit 702. In the multifunction image forming apparatus 1, since network scanning and printer output are performed independently, for example, it is necessary to specify which devices are to be used for performing the job, and to have a configuration for locking devices according to the job type. When device locking is completed, an event is transmitted to a copy job management unit 703. The copy job management unit 703 gives various instructions to a scanner management unit 704 and a printer management unit 705, which are device classes, and outputs an image that was input from a scanner engine 706 to a printer engine 707.

The following describes information managed by the resource management unit 702. Reference numeral 710 denotes resources, and although some resources do not have physical moving units such as a memory or a port, only physical apparatuses are shown in the present embodiment. Reference numeral 711 denotes device states. Here, "OFF" indicates the power off state, "SLEEP" indicates the power saving state, "IDLE" indicates the standby state, "RUNNING" indicates the operating state, and "ERROR" indicates the error state. These states change depending on the status of each device, and the states managed by the device management units 704 to 709 are managed collectively.

For example, in the case where scanning processing in the previous copy job is completed, and only print output remains, the scanner is in the idle state as indicated by reference numeral 712, and the printer is in the running state as indicated by reference numeral 713. Also, it can be understood that only the printer is in the device locked state as indicated by reference numeral 714, and a scanner job can be input in this state.

Also, a copy job 715 is specified as using the scanner and printer devices, and whether or not a job can be input can be determined based on this specification. For example, since the printer is currently in the locked state, the copy operation cannot be performed immediately, but even in the case of copying, scanning alone can be performed.

A screen 716 is an example of an operation screen for operations with multiple functions. Reference numeral 717 denotes a function tab including buttons for instantly switching between function screens by specifying functions. Reference numeral 718 denotes an overall stop button that is positioned outside the function screen. Reference numeral 719 denotes a function stop button that is positioned inside a specified function screen.

It is the stop button that is most influenced in the case of realizing physical switches with software buttons on a touch panel. There are cases where a stop button is for stopping a specific job as with the button 719, and cases where a stop button is for stopping the apparatus as a whole as with the button 718. The present invention resolves the problem that there may be situations where these critical buttons cannot be pressed due to performing control such that only one button on the touch panel can be pressed at a time. Specifically, the present invention enables providing a more secure configuration due to controlling buttons related to apparatus operations (the stop button 718 and the like) with priority.

Control with Respect to Pressing in Priority Area

Figure 8:
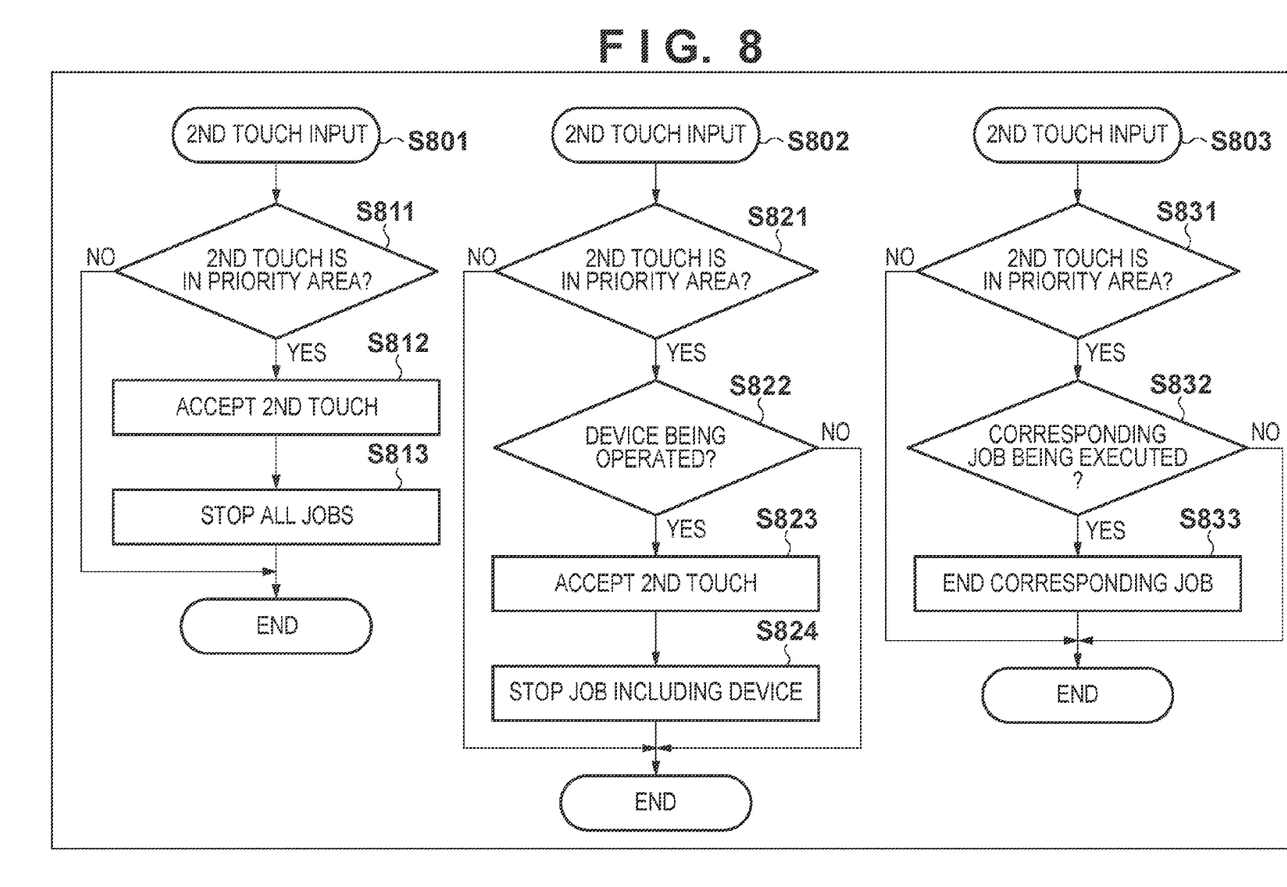
FIG. 8 is a flowchart showing control with respect to pressing in a priority area.

Next, control with respect to pressing in a priority area will be described with reference to FIG. 8. Note that the CPU 201 of the controller 3 performs overall control of the processing described below. A flowchart 801 shows processing for forcibly stopping all jobs. It is effective to employ this processing in a high-urgency situation. When it is determined that a second touch was made in a priority area, the second touch input in the priority area is enabled, and all jobs are immediately stopped.

Specifically, in step S811, the CPU 201 determines whether the second touch is a press made in a priority area. If the second touch is a press made outside the priority area, this processing ends as is. On the other hand, in the case of a press made in the priority area, in step S812 the CPU 201 accepts the second touch, and stops all jobs in step S813. Here, all jobs are stopped in step S813 since it is envisioned that the pressed priority area is the stop button 718.

A flowchart 802 shows processing for stopping a device that is operating. A determination is made as to whether a device is operating, and if a device is operating, the second touch input in the priority area is accepted, and a job stop event is issued for, for example, the job type 715 that can be looked up from the reference numeral 713. Specifically, in step S821, the CPU 201 determines whether the second touch is a press made in a priority area. If the second touch is a press made outside the priority area, this processing ends as is. On the other hand, in the case of a press made in the priority area, in step S822 the CPU 201 determines whether a device is currently operating. If a device is not currently running, this processing ends as is. On the other hand, if a device is currently running, the CPU 201 accepts the second touch in step S823, and stops the device that is currently running and stops the related job in step S824.

A flowchart 803 shows processing for stopping only a specified job. This processing is control with respect to input made on a stop button (such as the stop button 719) corresponding to a job that is being executed or a specified function, and in this processing, the copy job 715 corresponding to the stop button assigned to be a priority area is detected, and only that job is stopped. Specifically, in step S831, the CPU 201 determines whether the second touch is a press made in a priority area. This processing ends as is if the second touch is a press made outside the priority area. On the other hand, in the case of a press made in the priority area, in step S832 the CPU 201 determines whether that job is currently being executed. If that job is not currently being executed, this processing ends as is. On the other hand, if that job is currently being executed, the procedure proceeds to step S833, in which the CPU 201 ends that job.

Note that the present invention can be applied to not only input on a stop button, but also various types of input. For example, in the case where an existing hardware button that has the superiority of always being able to be pressed, such as a copy button or a power saving button, is realized using a software button, it is possible to apply control similar to the above-described control with respect to a stop button. The present invention can also be applied to input such as volume adjustment and changing of the screen brightness. Furthermore, the present invention can be applied to a button other than a button for giving some sort of instruction related to software or a function corresponding to content displayed on the touch panel screen at that time, that is to say, a button for giving the apparatus including the touch panel an instructing regarding processing that is to be executed, regardless of such functions and software. One example of this is the stop button, and if the stop button is pressed, stop processing is executed regardless of the content displayed on the touch panel screen at that time. Other examples include a print start button, a scan start button, a data transmission start button, a help button, and a reset button.

Conversely, buttons displayed outside the priority area (in a non-priority area) are buttons for making various types of settings related to copy processing, print processing, processing for transmission via FAX or E-mail, storage processing, scan processing, and the like. Examples include a button for selecting the output sheet size, a button for designating the reading resolution, a button for designating double-side printing or color printing, a button for designating the output layout, a button for designating a transmission destination, and a button for designating a storage location.

Also, although a priority area and a non-priority area are provided on the touch panel in the present embodiment, a configuration is possible in which the entire touch panel can be arbitrarily changed to a non-priority area by eliminating the priority area in accordance with a user setting. Specifically, a configuration is possible in which the user can arbitrarily change a setting indicating whether a stop button such as that described above is to be a priority button or not be a priority button. This configuration enables appropriately providing optimal operationality in conformity with the use mode of the apparatus or the operation mode of the system employing the apparatus. Alternatively, even in the case of providing a priority area, a configuration is possible in which the user can appropriately set which of the buttons displayed as software buttons are to be disposed in the priority area, that is to say, which buttons are to be priority buttons. This configuration also enables appropriately providing optimal operationality in conformity with the use mode of the apparatus or the operation mode of the system employing the apparatus.

Variations

Single-Touch Input Touch Panel

Next is a description of an example of the case in which the present invention is applied to a touch panel employing single-touch input. In the case of a single-touch input touch panel, the CPU 319 of the operation unit 5 performs control such that after detecting a first input, the CPU 319 waits for the press to be released and does not notify the CPU 201 even if a second touch is made. In the case where such control is employed, it is necessary to change the control based on a press made in a priority area in the CPU 319. The following describes a control flow in the CPU 319 with reference to FIG. 9. Note that the CPU 319 described below functions as a priority area determination means, an input control means, and a notification means.

Figure 9:
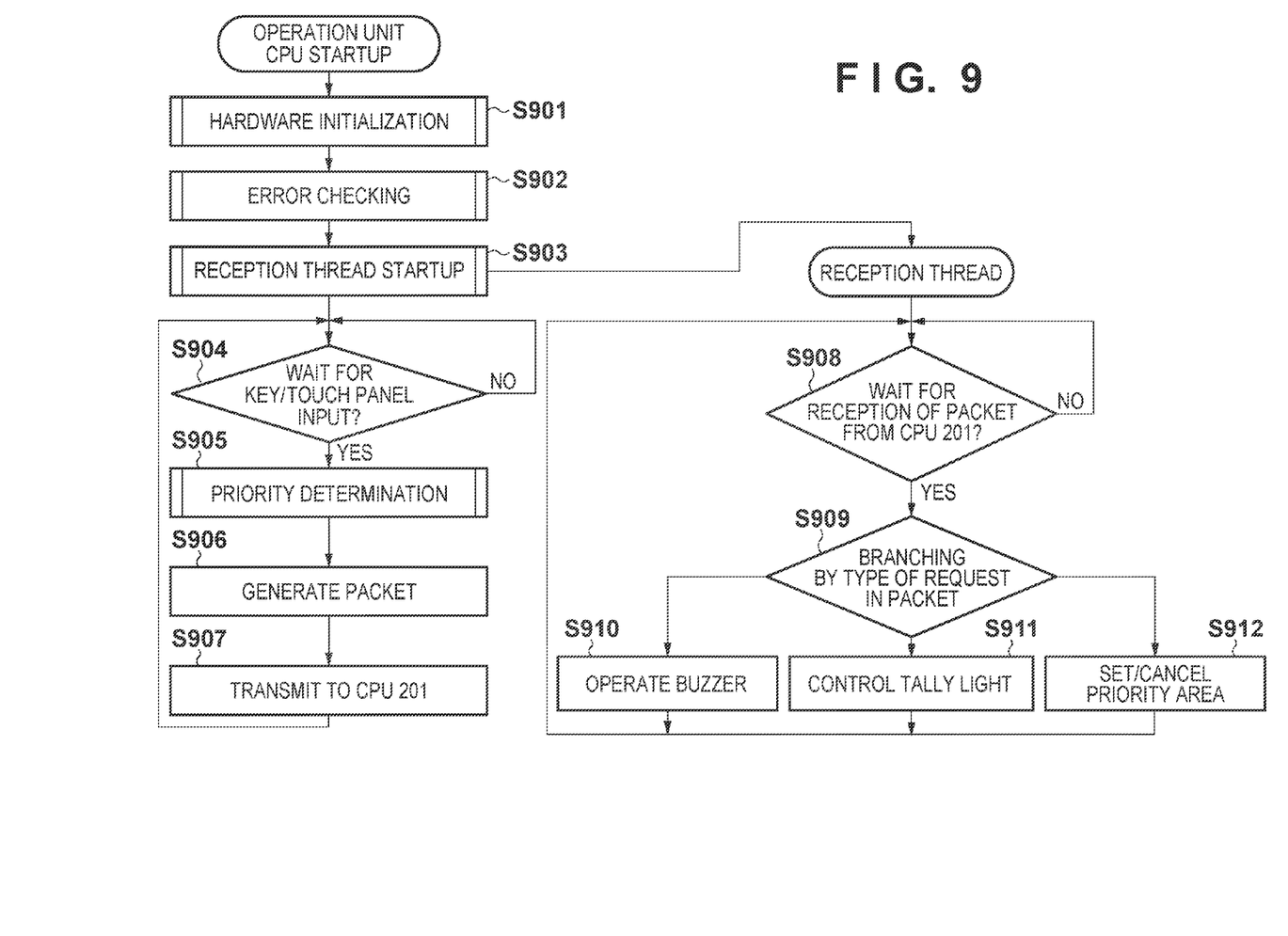
FIG. 9 is a flowchart showing a priority area determination method for a single-touch input touch panel according to a variation.

In step S901, the CPU 319 performs hardware initialization. Next, in step S902 the CPU 319 performs various types of error checking and executes a control program. In step S903, the CPU 319 starts a reception thread. The reception thread is a thread for always performing reading with respect to the interface 320 and receiving instructions from the CPU 201. In the reception thread, the processing of steps S908 to S912 is executed.

In step S908 the CPU 319 waits for packet reception. When a packet is received, the procedure proceeds to step S909, in which the CPU 319 detects the packet type. Various processing is executed based on the detected packet type, and then the procedure returns to step S908. Specifically, the CPU 319 operates the buzzer in step S910, performs tally light control in step S911, and sets or cancels the priority area in step S912.

After starting the reception thread in step S903, the procedure proceeds to step S904, in which the CPU 319 performs control for a transmission thread and waits for an event from a key or the touch panel. When the power supply is input, the operation unit 5 starts up in this way and independently moves to the standby state. There are cases where the CPU 201 disposes a priority button on the touch panel 317, and a notification regarding the priority area is sent via the interfaces 320 and 321 in such cases.

When the touch panel 317 is pressed, the procedure proceeds to step S905, in which the CPU 319 determines whether the input was made in the priority area. It is sufficient that this priority area determination is made according to the flowchart in FIG. 6, and in accordance with the result of this priority area determination, in step S906 the CPU 319 generates a packet, and then transmits the generated packet to the CPU 201 in step S907. Performing the priority area determination processing in the operation unit 5 in this way enables the application of the present invention to such a single-touch input touch panel as well. Note that since the CPU 201 conventionally also transmits packets for controlling the tally light 324 and buzzer 325 and performs packet analysis and hardware control in steps S910 and S911, it is sufficient to merely add an existing interface, and this configuration can be realized without an increase in hardware cost.

Other Embodiments

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-084078 filed on Apr. 5, 2011, which is hereby incorporated by reference herein in its entirety.

The invention claimed is:

1. A printing apparatus that executes a print job in accordance with image data that was input, comprising:
    a display unit configured to include a touch panel and display a plurality of buttons on the touch panel for inputting instructions to the printing apparatus in accordance with a touch operation performed by a user; and
    a control unit configured to perform control such that, among the plurality of buttons displayed by the display unit, if while a first button for inputting a setting with respect to a job to be executed by the printing apparatus is in a touched state and a touch operation is furthermore performed on a second button for inputting another setting with respect to the job, the setting indicated by the second button is not performed, and if while the first button for inputting the setting with respect to the job to be executed by the printing apparatus is in the touched state and a touch operation is furthermore performed on a third button for interrupting a print job being executed by the printing apparatus, the print job that is being executed is interrupted based on the touch operation performed on the third button,
    wherein a display area displayed by the display unit includes a first area and a second area,
    wherein the first button and the second button are displayed in the first area, and
    wherein the third button is displayed in the second area.

2. The printing apparatus according to claim 1, wherein whether a button among the plurality of buttons displayed by the display unit are to be displayed in the second area is selectable by the user.

3. The printing apparatus according to claim 1, wherein whether the second area is to be provided in the display area is selectable by the user.

4. The printing apparatus according to claim 1, wherein the printing apparatus executes copy processing for printing image data that was input by a scanner.

5. The printing apparatus according to claim 1, wherein the third button is a button for interrupting a copy job that is being executed.

6. The printing apparatus according to claim 1, wherein the touch panel detects multiple touches.

7. The printing apparatus according to claim 1,
    wherein the first area is a non-priority area, and
    wherein the second area is a priority area.

8. A method for controlling a printing apparatus that executes a print job in accordance with image data that was input, comprising:
    displaying, by a display unit that includes a touch panel, a plurality of buttons on the touch panel for inputting instructions to the printing apparatus in accordance with a touch operation performed by a user; and
    performing control such that, among the plurality of buttons displayed by the display unit, if while a first button for inputting a setting with respect to a job to be executed by the printing apparatus is in a touched state and a touch operation is furthermore performed on a second button for inputting another setting with respect to the job, the setting indicated by the second button is not performed, and if while the first button for inputting the setting with respect to the job to be executed by the printing apparatus is in the touched state and a touch operation is furthermore performed on a third button for interrupting a print job being executed by the printing apparatus, the print job that is being executed is interrupted based on the touch operation performed on the third button, wherein a display area displayed by the display unit includes a first area and a second area, wherein the first button and the second button are displayed in the first area, and wherein the third button is displayed in the second area.

9. A non-transitory computer-readable storage medium storing a computer program for causing a computer to perform the control method according to claim 8.

* * * * *